United States Patent Office 3,340,287
Patented Sept. 5, 1967

3,340,287
PROCESS FOR MAKING MIXED
CYCLOTRISILOXANES
Christian R. Sporck, Burnt Hills, N.Y., assignor to General Electric Company, a corporation of New York
No Drawing. Filed June 20, 1966, Ser. No. 558,566
11 Claims. (Cl. 260—448.2)

ABSTRACT OF THE DISCLOSURE

Hexaorganocyclotrisiloxanes containing two diphenylsiloxane units and one other diorganosiloxane unit are prepared by reacting tetraphenyldisiloxanediol-1,3 with a diorganodihalogenosilane in the presence of a solvent and a hydrogen halide acceptor. The cyclotrisiloxanes are useful as intermediates for rearrangement and condensation into high molecular weight polydiorganosiloxanes having a regular structure as distinguished from a random structure.

---

This application is a continuation-in-part of my applications Ser. Nos. 160,265; 160,268; 160,269; 160,270; 160,271; and 160,272; all filed Dec. 18, 1961, and assigned to the same assignee as the present invention; and my application Ser. No. 240,440 filed Nov. 27, 1962, now abandoned, which was a continuation-in-part of application Ser. No. 160,264 filed Dec. 18, 1961, now abandoned, both of said applications being assigned to the same assignee as the present invention.

This application relates to an improved process for the manufacture of mixed cyclotrisiloxanes of high phenyl content.

A number of cyclic organosilicon materials are known in the art. These materials are useful in the formation of various types of polymeric organisilicon compounds. One particularly useful class of organopolysiloxanes are cyclotrisiloxanes having a high phenyl content, but which contain some substituents other than phenyl groups. These materials are particularly useful since they can be readily converted to high molecular weight organopolysiloxanes which exhibit outstanding thermal stability and radiation resistance and which have high strength without intractability.

However, before the present invention, there has been no satisfactory method for preparing such cyclotrisiloxanes in high yields. The cyclotrisiloxanes with which this invention is concerned are those having the formula:

(1) 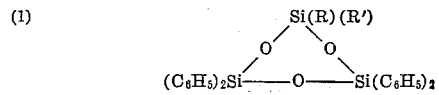

where R and R' are each members selected from the class consisting of monovalent hydrocarbon radicals, halogenated monovalent hydrocarbon radicals, and cyanoalkyl radicals. The present invention is based on my discovery of an unexpectedly efficient method for the preparation of these cyclotrisiloxanes. This process involves the reaction between tetraphenyldisiloxanediol-1,3 having the formula:

(2) 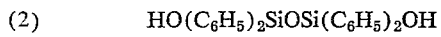  HO(C$_6$H$_5$)$_2$SiOSi(C$_6$H$_5$)$_2$OH and a diorganodihalogenosilane having the formula:

(3) 

where R and R' are as previously defined and X represents halogen, e.g., fluorine, chlorine, bromine, and iodine, and preferably chlorine. The reaction of the present invention is effected in the presence of a hydrogen halide acceptor, such as, for example, a tertiary amine having only carbon, hydrogen, and nitrogen in the molecule.

The unique and unexpected features of the present invention can be graphically illustrated by the differences in yields between certain prior art methods of forming cyclotrisiloxanes and the present method. For example, when the teachings of British Patent 941,501 are followed starting with 1,5-dichloro-1,1,3,5,5-pentaphenyl-3-methyltrisiloxane, the yield of methylpentaphenylcyclotrisiloxane is only 30.2 percent. In contrast to this, when tetraphenyldisiloxanediol-1,3 is reacted with methylphenyldichlorosilane in the presence of pyridine in accordance with the present process, the yield of methylpentaphenylcyclotrisiloxane is over 88 percent. In fact, employing the procedure of the aforementioned British patent, the yield of cyclotrisiloxanes is never above about 50 percent. In contrast to this, following the procedure of the present invention, the yield of cyclotrisiloxanes is greater than about 80–85 percent.

The present invention is applicable to the preparation of a great variety of mixed cyclotrisiloxanes. The common feature of each of these many cyclotrisiloxanes is that they contain two diphenylsiloxane units and a third unit which is derived from the diorganodihalogenosilane of Formula 3.

The many diorganodihalogenosilanes within the scope of Formula 3 can be best appreciated by the radicals which can be represented by R and R'. These radicals include alkyl radicals, e.g., methyl, ethyl, propyl, butyl, octyl, dodecyl, etc. radicals; aryl radicals, e.g., phenyl, tolyl, xylyl, naphthyl, etc. radicals; aralkyl radicals, e.g., benzyl, phenylethyl, phenylpropyl, etc, radicals; cycloalkyl radicals, e.g., cyclohexyl, cycloheptyl, etc. radicals; alkenyl radicals, e.g., vinyl, allyl, butenyl, etc. radicals; cycloalkenyl radicals, e.g., cyclohexenyl, cycloheptenyl, etc. radicals; halogenated monovalent hydrocarbon radicals such as haloalkyl radicals, e.g., chloromethyl, chloroethyl, trifluoromethylethyl, trifluoromethylpropyl, alpha, alpha - perfluoropropyl, beta - bromoethyl, etc, radicals; haloaryl radicals, e.g., chlorophenyl, dibromophenyl, trifluoromethylphenyl, bromophenyl, etc. radicals; chlorinated alkenyl radicals, e.g., beta-chlorovinyl, gamma-chloroallyl, etc. radicals, as well as other chlorinated monovalent hydrocarbon radicals; cyanoalkyl radicals, e.g., beta-cyanoethyl, beta-cyanopropyl, gamma-cyanopropyl, delta-cyanobutyl, etc. radicals. Specific diorganodihalogenosilanes within the scope of Formula 3 include all silanes in which the R and R' groups are as described above. Both the R and R' groups can vary without limits and can be the same or different. Illustrative of some of the diorganodihalogenosilanes within the scope of Formula 3 which lead to the corresponding cyclotrisiloxanes of Formula 1 are, for example, dimethyldichlorosilane, methylphenyldichlorosilane, methylethyldichlorosilane, methylpropyldichlorosilane, diethyldichlorosilane, methylvinyldichlorosilane, methylallyldichlorosilane, divinyldibromosilane, methylphenyldiiodosilane, phenylpropyldifluorosilane, methyl-beta-cyanoethyldichlorosilane, bis-(beta-cyanoethyl)dichlorosilane, ethyl-beta-cyanoethyldichlorosilane, α,α,α-trifluoropropylmethyldichlorosilane, α-chloropropylmethyldichlorosilane, etc.

The hydrogen halide acceptors employed in the process of the present invention are also well known in the art and comprise basic compounds. In particular, the most desirable hydrogen halide acceptors are the various tertiary amines having only carbon, hydrogen and oxygen. These tertiary amines include heterocyclic tertiary amines, such as pyridine, which is the preferred halogen halide acceptor within the scope of the present invention, as well as simple trialkyl and triaryl amines, such as triethylamine, trimethylamine, tri-n-butyl amine, triphenylamine, N,N-dimethylaniline, N-methyl - N - ethyl-aniline, tritolylamine, etc.; as well as more complicated amines, such as N,N,N′,N′-tetramethylethylenediamine and the like.

The proportions of the various ingredients used in the preparation of the cyclotrisiloxanes of the Formula 1 can vary within fairly wide limits. On a theoretical basis, the reaction involves one mole of tetraphenyldisiloxanediol-1,3 and one mol of the diorganodihalogenosilane of Formula 3. The reaction between the components splits out two moles of hydrogen halide with the concurrent formation of the two siloxane linkages which form the cyclotrisiloxanes. To accept the two moles of hydrogen halide, stoichiometry requires the presence of two moles of the hydrogen halide acceptor, which is the preferred ratio.

While the theoretical ratio of the reactants has been described above, the ratio of the ingredients can actually vary within wide limits. For example, tetraphenyldisiloxanediol-1,3 can be employed in amounts equal to from about 0.5 to 2 moles per mole of the diorganodichlorosilane of Formula 3. The hydrogen halide acceptor can be employed in excess, with there being from about 2 to 30 moles of the acceptor per mole of whichever of the other two reactants is present in the smaller amount.

Because the tetraphenyldisiloxanediol-1,3 and the resulting cyclotrisiloxane are solids at room temperature, it is preferable to effect the reaction in the presence of a solvent for both the tetraphenyldisiloxanediol and the cyclotrisiloxane, which solvent is inert to the reactants under the conditions of the reaction. Suitable solvents include diethyl ether, tetrahydrofuran, tetrahydropyran, n-hexane, benzene, xylene, toluene, aromatic and aliphatic mineral spirits, etc. In general, the solvent is employed in the ratio of from about 1 to 50 parts by weight based on the total weight of the other components of the reaction mixture.

The rate and order of addition of the various materials used to prepare the cyclotrisiloxanes of Formula 1 can vary without significant limit. In the preferred embodiment of my invention, however, the tetraphenyldisiloxanediol-1,3, the diorganodihalogenosilane and the hydrogen halide acceptor are each dissolved in separate portions of solvent and then the tetraphenyldisiloxanediol solution and the diorganodihalogenosilane solution are added simultaneously to the hydrogen halide acceptor solution. Alternatively, all of the reaction mixture components can be mixed together at one time. In other methods, intermediate methods of mixing the components can be used.

Because the reaction to form the cyclotrisiloxane proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 100° C. is not precluded. Depending upon the proportions of the ingredients, the reaction temperature and the particular solvent employed, the time required for completion of the reaction can vary from about ¼ hour to 24 hours or more.

Preferably, the reaction is effected with equimolar amounts of the tetraphenyldisiloxanediol and the diorganodichlorosilane of Formula 3 to reduce the formation of by-products. Employing these equimolar proportions, the purification of the desired cyclopolysiloxane is simplified, since no significant amount of unreacted starting materials is present in the reaction mixture.

After the reaction is completed, the reaction mixture consists of a solution of the desired cyclotrisiloxane together with any unreacted starting materials and a precipitate of hydrogen halide with the hydrogen halide acceptor. Since the preferred diorganodihalogenosilanes of Formula 3 are chlorosilanes and since the preferred hydrogen halide acceptor is pyridine, the precipitate is generally pyridine hydrochloride. This pyridine hydrochloride or other hydrohalide of the hydrogen halide acceptor and the desired cyclotrisiloxane are isolated from each other and from the reaction mixture by conventional techniques. These techniques generally involve the removal of the hydrogen halide acceptor hydrohalide from the reaction mixture followed by removal of solvent to produce a crude product which is then purified by washing, by distillation, by recrystallization, or by a combination of operations. For example, the hydrogen halide of the acceptor can be removed from the reaction mixture by filtration, followed by water washes to remove any remaining hydrohalide.

Alternatively, after filtration of the acid acceptor hydrohalide, the filtrate can be stripped of solvent and redissolved in a material such as toluene, which will dissolve the cyclotrisiloxane but which will not dissolve the hydrohalide which is then filtered or washed from the toluene solution. The toluene is then evaporated and the resulting solids are extracted with boiling hexane. The hexane is evaporated and the resulting material is purified by recrystallization. Recrystallization of the desired cyclotrisiloxane can be effected from n-hexane, butanol, isopropanol or a mixture of these materials or a mixture of three parts by volume of ethanol and one part by volume of cyclohexane. As a further alternative, the toluene can be stripped from the above-mentioned washed toluene and the residue can be distilled to produce the cyclotrisiloxane of Formula 1.

The purified cyclotrisiloxane of Formula 1 can then be polymerized alone or with other cyclotrisiloxanes by heating these materials in the presence of a conventional organopolysiloxane rearrangement and condensation catalyst, such as potassium hydroxide, employing from about 10 to 1,000 parts per million potassium hydroxide per part of cyclotrisiloxanes. Suitable reaction temperatures are those sufficient to melt the cyclotrisiloxane, which temperature is usually of the order of 100 to 150° C. The cyclotrisiloxanes react in a few seconds to form extremely high molecular weight polysiloxanes of recurring units which correspond to the cyclotrisiloxane starting materials. These high molecular weight polysiloxanes are generally tough gums which can be mixed with fillers and cured to silicone rubber articles having unusually high thermal stability, radiation resistance and strength. Curing can be effected by high energy ionizing radiation, as taught by Patent 2,763,609—Lewis et al., and in some cases, polymerization can be effected by various organic peroxide cross-linking agents, such as benzoyl peroxide or the like.

The following examples are illustrative of the practice of my invention and are not intended for purposes of limitation. All parts are by weight.

Example 1

Into a reaction vessel was added 228 parts of tetraphenyldisiloxanediol-1,3 dissolved in 700 parts diethyl ether. Into a second reaction vessel were placed 71 parts of dimethyldichlorosilane, 2100 parts diethyl ether and 150 parts pyridine. The contents of the first reaction vessel were added to the second reaction vessel and the entire mixture was stirred for two hours, during which time a pyridine hydrochloride precipitate formed. This precipitate was removed by filtration and the diethyl ether was stripped from the reaction mixture, leaving a solid material. This solid was dissolved in toluene at a temperature of about 85° C. and the solution was allowed to cool to 40° C. and filtered to remove further pyridine hydrochloride. The toluene was then removed by evaporation, yielding another solid product which was extracted with boiling hexane. Hexane was evaporated from this extract leaving a solid which was recrystallized from n-butanol to produce 1,1-dimethyl-3,3,5,5-tetraphenylcyclotrisiloxane having the formula:

(4)
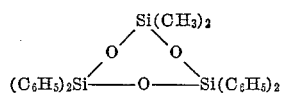

This was a white crystalline material having a melting point of about 88° C. The identity of this compound was confirmed by infrared analysis which showed a doublet at 8.9 microns and a peak at 13.9 microns, corresponding to the diphenylsiloxy unit, a peak at 9.8 microns, corresponding to the cyclotrisiloxane ring and a high intensity peak at 11.8 microns which corresponds to the isolated dimethylsiloxy group.

*Example 2*

To a stirred mixture of 20.7 parts of tetraphenyldisiloxanediol-1,3 and 6.45 parts of dimethyldichlorosilane in 175 parts of diethyl ether was added 7.90 parts pyridine over a 5 minute period. Stirring was continued for 15 minutes and then 200 parts water was added to stop the reaction and dissolve the pyridine hydrochloride which had formed. After separation of the aqueous layer, the ether solution was washed twice more with water and ether was then evaporated under vacuum, resulting in a solid material. Thirty-five parts of petroleum ether was added to the solid and after standing for 16 hours, 3.95 parts of unreacted tetraphenyldisiloxanediol-1,3 was recovered. Removal of the petroleum ether resulted in 11 parts of a crude product. Repeated recrystallization from n-hexane gave pure 1,1-dimethyl-3,3,5,5-tetraphenylcyclotrisiloxane which melted at 88.2 to 88.7° C. The identity of this compound was confirmed by infrared analysis and by elemental analysis. The infrared curve was identical to the curve for the product of Example 1. The cyclotrisiloxane contained 67.0% carbon and 6.3% hydrogen, as compared with the theoretical values of 66.4% carbon and 5.6% hydrogen. This cyclopolysiloxane was polymerized by mixing 6 parts of the cyclopolysiloxane with 0.05 part of a 1 percent dispersion of potassium hydroxide in octamethylcyclotetrasiloxane in a reaction vessel. The reaction vessel was subjected to a vacuum of 10⁻⁴ mm. and heated until the cyclotrisiloxane had melted and entrained air was removed. The reaction vessel was then heated at a temperature of 110° C. for 40 minutes to yield a tough, elastic gum which consisted essentially of recurring units having the formula:

(5) —(C₆H₅)₂SiO—(C₆H₅)₂SiO—(CH₃)₂SiO—

This gum contained 66.8% carbon and 6.1% hydrogen, as compared with the theoretical values of 66.4% carbon and 5.6% hydrogen. This gum was cross-linked by irradiation with electrons having energies of about 800,000 volts peak to a dose of about 100,000,000 roentgens to produce a cross-linked, unfilled rubber having a tensile strength of about 750 p.s.i. and an elongation of about 420%.

*Example 3*

To a reaction vessel was added 79.1 parts of pyridine and 1750 parts of benzene. Slowly and simultaneously there was added to this reaction mixture a first solution of 207.3 parts of tetraphenyldisiloxanediol-1,3 in 700 parts benzene and a second solution of 64.5 parts of dimethyldichlorosilane in 825 parts benzene. The addition took place over a three-hour period and the reaction mixture was allowed to stand for 16 hours. Thereafter, the reaction mixture was stripped of benzene at a temperature of 35 to 40° C. at 18 to 20 mm. and 270 parts toluene was added to dissolve the residue. This toluene solution was washed four times with 250 part portions of water and after four washes was completely free of any trace of chloride. The tolune was then stripped from the reaction mixture at a temperature of 35 to 40° C. at 18 to 20 mm., leaving a solid residue which was fractionally distilled at 0.02 mm. and a temperature of about 200 to 210° C. to produce 204.2 parts of 1,1-dimethyl-3,3,5,5-tetraphenylcyclotrisiloxane which melted at a temperature of 87 to 88° C. This corresponded to a yield of 86.8 percent. The infrared curve of this material was identical to the curve from the products of Examples 1 and 2.

*Example 4*

To a solution of 101.2 parts triethylamine in 1750 parts benzene was simultaneously added a solution of 207.3 parts tetraphenyldisiloxanediol-1,3 in 700 parts benzene and a solution of 64.5 parts dimethyldichlorosilane in 825 parts benzene over a three-hour period. After standing for 8 hours, a triethylamine hydrochloride precipitate was filtered from the reaction mixture and the filtrate was stripped of benzene at 35 to 40° C. and 18 to 20 mm. The precipitate was redissolved in 275 parts toluene, washed four times with water, and the toluene was stripped off at the same stripping conditions to produce a solid material, which was distilled at 213 to 215° C. at 0.02 mm. to yield 1,1-dimethyl-3,3,5,5-tetraphenylcyclotrisiloxane in an amount of 208.4 parts. This material, which had a melting point of 85.5 to 87° C. was recovered in an amount equal to an 88.8 percent yield. Identity of the product was confirmed by infrared analysis, which produced a scan identical to the scan of the same material prepared in Examples 1, 2, and 3.

*Example 5*

In a variation of the procedure of Example 3, three solutions were formed. The first contained 41.5 parts of tetraphenyldisiloxanediol-1,3 in 140 parts benzene. The second solution was 12.9 parts dimethyldichlorosilane in 165 parts benzene. The third solution was 15.9 parts pyridine in 300 parts benzene. These three solution were poured together in a few seconds and stirred for 16 hours. At the end of this time, the procedure of Example 3 for purification was followed, with the stripping of benzene, the dissolving in toluene, the washing of the solution, the stripping of the toluene, and the distillation of the final product at a temperature of 193 to 195° C. at 0.01 mm. to yield 1,1-dimethyl-3,3,5,5-tetraphenylcyclotrisiloxane whose identity was confirmed by infrared analysis. The yield was slightly above 80%.

*Example 6*

To a stirred mixture of 41.4 parts of tetraphenyldisiloxanediol and 14.3 parts of methylethyldichlorosilane in 175 parts benzene was added 20.0 parts pyridine over a one-hour period. Stirring was continued for an additional 15 minutes and then 400 parts water was added to stop the reaction and dissolved the pyridine hydrochloride which had formed. After separation of the aqueous layer, the benzene solution was washed with water and the benzene evaporated under vacuum, resulting in a solid material. This solid material was recrystallized from 100 parts of an equal volume mixture of hexane and isopropanol to produce 41 parts of 1-methyl-1-ethyl-3,3,5,5-tetraphenylcyclotrisiloxane having the formula:

(6)
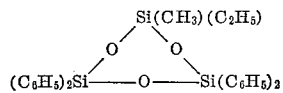

This material had a melting point of 75 to 76° C., and was a white crystalline material. The identity of the material was confirmed by infrared analysis which showed the presence of the cyclotrisiloxane ring, the silicon-bonded phenyl groups, the silicon-bonded methyl group and the silicon-bonded ethyl group. This cyclotrisiloxane was polymerized by mixing 10 parts of the cyclotrisiloxane with 0.1 part of 1% dispersion of potassium hydroxide in octamethylcyclotetrasiloxane in a reaction vessel. The reaction vessel was evacuated to a pressure of 10 microns and heated at a temperature of 115° C. for 20 minutes to yield a tough, elastic gum which consisted essentially of recurring units having the formula:

(7) —(C$_6$H$_5$)$_2$SiO—(C$_6$H$_5$)$_2$SiO—(CH$_3$)(C$_2$H$_5$)SiO—

This gum had an intrinsic viscosity of about 1.6 deciliters per gram in toluene at 30° C. This gum was converted to a cross-linked, unfilled silicone rubber by irradiation to a dose of 100×10$^6$ roentgens. The 41 parts of the methylethyltetraphenylcyclotrisiloxane corresponded to an 84.7 percent yield.

*Example 7*

To a reaction vessel containing 79.1 parts of pyridine dissolved in 1750 parts benzene were simultaneously added a first solution of 207.3 parts of tetraphenyldisiloxanediol-1,3 in 700 parts benzene and a second solution of 71.6 parts of methylethyldichlorosilane in 825 parts benzene. The addition was effected at room temperature over a three-hour period after which the solution was allowed to stand for 16 hours at room temperature. At the end of this time, the precipitate which had formed was filtered and the benzene solvent was stripped from the filtrate at a temperature of 35 to 40° C. and a pressure of 18 to 20 mm. The solid residue was then redissolved in 275 parts toluene, washed four times with water, and the toluene was stripped from the reaction mixture under the same condition as the benzene. This resulted in a solid material which was distilled at a temperature of 212 to 214° C. at 0.02 mm. to produce 211.8 grams of 1-methyl-1-ethyl-3,3,5,5-tetraphenylcyclotrisiloxane, which had a melting point of 73.5 to 74.5° C. The 211.8 grams recovered corresponded to an 87.4% yield of the desired product. An infrared scan of this product was identical to the scan of the product of Example 6.

*Example 8*

To a reaction vessel was added 41.4 parts of tetraphenyldisiloxanediol-1,3 and 15.7 parts of methyl-n-propyldichlorosilane and 175 parts benzene. While the mixture was being stirred for one hour, 20.0 parts pyridine were added. The stirring was continued for ½ hour and then 400 parts water was added to stop the reaction and dissolve the pyridine hydrochloride which had formed. After separation of the aqueous layer, the benzene solution was washed with water and the benzene was evaporated under vacuum resulting in a solid material. Eighty parts of isopropanol were then used to recrystallize this material to produce 1-methyl-1-n-propyl-3,3,5,5-tetraphenylcyclotrisiloxane having the formula:

(8) 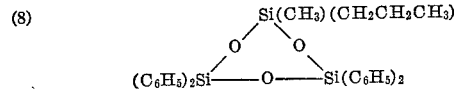

This material had a melting point of 67 to 68° C. Its identity was confirmed by infrared analysis which showed the presence of silicon-bonded methyl groups, silicon-bonded phenyl groups, silicon-bonded n-propyl groups, and the cyclotrisiloxane ring. Following the procedure of Example 6, this material was converted to a high molecular weight organopolysiloxane gum containing recurring structural units having the formula:

(9) —(C$_6$H$_5$)$_2$SiO—(C$_6$H$_5$)$_2$SiO
 —(CH$_3$)(CH$_3$CH$_2$CH$_2$)SiO—

This gum was converted to a cross-linked silicone rubber by irradiation with high energy electrons to a dose of 50×10$^6$ R.

*Example 9*

To a solution of 16.1 parts of bis-(p-chlorophenyl)dichlorosilane and 16 parts pyridine in 140 parts diethyl ether was added a solution of 20.7 parts of tetraphenyldisiloxanediol-1,3 in 70 parts diethyl ether. The reaction mixture was stirred during the addition and then allowed to stand for 3 hours during which time pyridine hydrochloride precipitated. The precipitate was removed by filtration and diethyl ether was removed by evaporation. The resulting solids were dissolved in toluene and a small amount of pyridine hydrochloride precipitate was removed by filtration. The toluene was stripped from the reaction mixture and the resulting solids were recrystallized three times from a mixture of equal parts by weight of benzene and cyclohexane to produce 1,1-bis-(p-chlorophenyl)-3,3,5,5-tetraphenylcyclotrisiloxane having the formula:

(10) 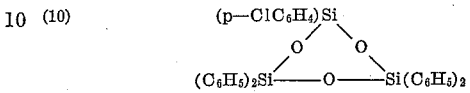

This material had a melting point of 206 to 207° C. The identity of the material was confirmed by infrared analysis which showed a peak of 12.3 microns corresponding to the p-substituted phenyl group, a peak of 9.8 microns corresponding to the cyclotrisiloxane ring, and a doublet at 8.9 microns and a peak of 11.8 microns corresponding to diphenylsiloxy units. Chemical analysis showed the presence of 9.4% Cl, 64.6% C, 4.3% H, and 11.8% Si, as compared to the theoretical values of 10.7% Cl, 65.2% C, 4.2% H, and 12.7% Si. About 7.5 parts of this cyclic material was heated at a temperature of 325° C. and maintained at a pressure of about 10 microns to remove any entrained air and moisture. At the end of about 30 minutes, a tough, transparent polymer was formed which consisted essentially of the following recurring structural units:

(11) —(C$_6$H$_5$)$_2$SiO—(C$_6$H$_5$)$_2$SiO—(p—ClC$_6$H$_4$)$_2$SiO—

This polymer had an intrinsic viscosity of about 0.52 deciliter per gram, a molecular weight of about 85,000 and contained about 130 of the units of Formula 11 per molecule. The polymer was a hard, solid material at room temperature and, when heated to a temperature above 50° C., was a very viscous gum. This gum is used to encapsulate a transformer by forcing the gum at 75° C., into a container holding a transformer. Upon cooling of the container to room temperature (20° C.), the encapsulated transformer is removed from the container to provide a transformer encapsulated with a hard housing resistant to ionizing irradiation and the effect of aliphatic solvents.

*Example 10*

To a solution of 10.2 parts phenylvinyldichlorosilane and 15 parts of pyridine in 210 parts diethyl ether was added a solution of 20.7 parts of tetraphenyldisiloxanediol-1,3 in 70 parts diethyl ether. The resulting reaction mixture was stirred for two hours and allowed to stand for sixteen hours, during which time pyridine hydrochloride precipitated. This precipitate was removed and the filtrate was heated at a temperature of 30 to 40° C. to remove the ether and then at a temperature of about 115 to 116° C. to remove excess pyridine. The resulting solids were dissolved in hot butanol and allowed to recrystallize. The recrystallized solids were washed twice with ethanol and then recrystallized twice more from an equal volume mixture of heptane and propanol, resulting in a white crystalline material having a melting point of 130 to 131.5% C. This material was vinylpentaphenylcyclotrisiloxane having the formula:

(12) 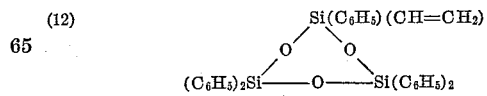

The identity of this product was confirmed by infrared analysis which showed a doublet at 8.9 microns and a peak at 13.9 microns corresponding to the diphenylsiloxy groups, a peak at 9.8 microns corresponding to the cyclotrisiloxane ring, and peaks at 7.1 and 10.3 microns corresponding to the vinyl silyl group. Chemical analysis showed the presence of 5.5% vinyl groups, 70.4% C., and 5.2% H, as compared with the theoretical values of 5.0% vinyl, 70.7% C, and 5.1% H. About 7.5 parts of this cyclotrisiloxane was heated to a temperature of about 140° C. where it became liquid, and 0.1 part of a 0.4 percent solution of potassium hydroxide in octamethylcyclotrisiloxane was added to the liquid. Within five seconds, the liquid material polymerized to a tough, transparent gum which was maintained at polymerization temperature for fifteen additional minutes. At the end of this time, the resulting product was a linear polydiorganosiloxane consisting essentially of the following recurring structural units:

(13) —(C₆H₅)₂SiO—(C₆H₅)₂SiO
—(C₆H₅)(CH₂=CH)SiO—

This material had an intrinsic viscosity of about .76 deciliter per gram and a molecular weight of about 180,000, indicating that the average polymer molecule contained about 320 of the units of Formula 13. Infrared analysis of the linear polymer confirmed the fact that the cyclotrisiloxane structure was no longer present. A silicone rubber is prepared from this polymer by mixing 1.0 part of the polymer with 0.4 part silica aerogel and 0.04 part benzoyl peroxide and heating the polymer in a closed mold for ten minutes at 125° C. with a post-cure for one hour at 150° C. The resulting cured silicone rubber is a strong elastic material having a high degree of thermal stability and resistance to the effects of ionizing radiation.

Example 11

To a solution of 7.1 parts of methylvinyldichlorosilane and 50 parts of pyridine in 210 parts of diethyl ether was added a solution of 20.7 parts of tetraphenyldisiloxanediol-1,3 in 70 parts diethyl ether. The reaction mixture was stirred and allowed to stand for 16 hours, during which time pyridine hydrochloride precipitated. The pyridine hydrochloride precipitate was removed by filtration and the diethyl ether and unreacted methylvinyldichlorosilane were removed by evaporation. The resulting solids were dissolved in hot toluene, a small amount of insoluble material was filtered from the solution, and the toluene solvent was stripped from the filtrate. The resulting solids were then twice recrystallized from a mixture of four parts by volume ethanol and one part by volume cyclohexane to yield a pure white crystalline material which consisted of 1-methyl-1-vinyl-3,3,5,5-tetraphenylcyclotrisiloxane having the formula:

(14)
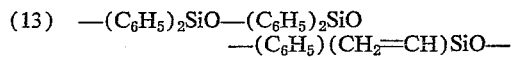

This material had a melting point of 71 to 72° C. Its identity was confirmed by infrared analysis which showed a doublet at 8.9 microns and a peak at 13.9 microns corresponding to the diphenylsiloxy units, a peak at 9.8 microns corresponding to the cyclotrisiloxane ring, a peak at 7.9 microns corresponding to the methylsilyl group, and peaks at 7.1 and 10.3 microns corresponding to the vinylsilyl group. Chemical analysis showed the presence of 5.3% vinyl groups, 67.5% C, 6.1% H, and 16.9% Si, as compared with the theoretical values of 5.6% vinyl groups, 67.2% C, 5.4% H, and 17.4% Si. A polymer was prepared by heating 7.5 parts of this cyclotrisiloxane at a temperature of 108° C. to melt the crystalline material. Then about 0.1 part of a 0.4 percent potassium hydroxide solution in octamethylcyclotetrasiloxane was added and the mixture was stirred rapidly. Polymerization began within about 30 seconds and the mixture was allowed to stand at 108° C. for an additional 15 minutes, resulting in a polymeric material consisting essentially of the following recurring structural units:

(15) —(C₆H₅)₂SiO—(C₆H₅)₂SiO—
(CH₃)(CH₂=CH)SiO—

This material had an intrinsic viscosity of about 0.32 deciliter per gram when measured in toluene at 30° C.

and a molecular weight of about 32,000, indicating that the average molecule contained about 66 units of Formula 15. Infrared analysis of the linear polymer confirmed that the cyclotrisiloxane structure was no longer present, while the diphenylsiloxane units and the silicon-bonded methyl and silicon-bonded vinyl groups were still present. A silicone rubber is prepared from this polymer by mixing 100 parts of the polymer with 40 parts silica aerogel and 4 parts benzoyl peroxide and heating the polymer in a closed mold for 10 minutes at 125° C. with a post-cure for 24 hours at 150° C. The resulting cured silicone rubber is a strong, elastic material having a high degree of thermal stability and resistance to the effects of ionizing radiation.

Example 12

To a reaction vessel containing 79.1 parts pyridine dissolved in 1750 parts of benzene were simultaneously added over a three-hour period two separate solutions. The first contained 207.3 parts of tetraphenyldisiloxanediol-1,3 in 700 parts of benzene and the other contained 70.5 parts of methylvinyldichlorosilane in 825 parts of benzene. The reaction mixture was allowed to stand for 10 hours after the addition and the benzene was stripped from the mixture at a temperature of 35 to 40° C. at a pressure of 18 to 20 mm. leaving a solid residue. About 275 parts of toluene was then added to dissolve the residue and the toluene solution was then washed four times with 250 part portions of water to remove all traces of chloride. The toluene was then stripped from the reaction mixture at a temperature of 35 to 40° C. at a pressure of 18 to 20 mm. to produce a solid product which was distilled at a temperature of 205 to 209° C. at 0.02 mm. to yield 211.7 parts of 1-methyl-1-vinyl-3,3,5,5,-tetraphenylcyclotrisiloxane which had a melting point of 83.5 to 84° C. The infrared scan of this compound was identical to the infrared scan of the material obtained in Example 11. The 211.7 parts recovered corresponds to an 88% yield of the desired cyclotrisiloxane.

Example 13

To a solution of 9.6 parts methylphenyldichlorosilane and 15 parts pyridine in 210 parts diethyl ether was added a solution of 20.7 parts tetraphenyldisiloxanediol-1,3 in 70 parts diethyl ether. The resulting solution was stirred vigorously and allowed to stand for 6 hours, during which time pyridine hydrochloride precipitated. The pyridine hydrochloride was removed by filtration and the resulting mixture was stirpped at a temperature up to about 85° C. to remove the diethyl ether and any unreacted methylphenyldichlorosilane. The resulting solids were dissolved in hot toluene and some undissolved pyridine hydrochloride was removed by filtration. The toluene was then removed by evaporation. The solids were then recrystallized from n-heptane and then recrystallized twice more from an equal volume solution of cyclohexane and ethanol, resulting in methylpentaphenylcyclotrisiloxane having the formula:

(16)
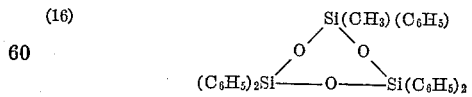

This material had a melting point of from 108 to 109.5° C. The identity of the compound was confirmed by infrared analysis which showed a doublet at 8.9 microns and a peak at 13.9 microns corresponding to the diphenylsiloxane units, a peak of 9.8 microns corresponding to the cyclotrisiloxane ring, and peaks at 7.9 and 12.5 microns corresponding to the methylphenyl siloxy group. Chemical analysis showed the presence of 69.2% C, 5.43% H, and 16.1% Si, as compared with the theoretical values of 69.9% C, 5.3% H, and 15.8% Si. The cyclotrisiloxane was converted to a diorganopolysiloxane gum by heating 7.5 parts of the cyclotrisiloxane to a temperature of about 120° C. under a pressure of about 10 microns to remove any entrained air or moisture and 0.1 part of a 0.4% potassium hydroxide solution in octamethylcyclotetrasiloxane was added. Polymerization began within three minutes and the polymerization mixture was retained at a temperature of about 120° C. for a total of 15 minutes. At the end of this time, a firm, elastic transparent gum was obtained. This gum was soluble in benzene and toluene. Infrared analysis of the gum was the same as the curve for the starting cyclopolysiloxane except that the peak at 9.8 microns corresponding to the cyclotrisiloxane ring was missing, indicating that the resulting product consisted essentially of units having the formula:

(17) —C$_6$H$_5$)$_2$SiO—(C$_6$H$_5$)$_2$SiO—
   (C$_6$H$_5$)(CH$_3$)SiO—

This gum had an intrinsic viscosity of 0.60 deciliters per gram in toluene at 30° C. and contained about 200 units of Formula 17, having a molecular weight of about 100,000. A silicone rubber is prepared by milling one part of the gum with 0.4 part silica aerogel and subjecting the resulting mixture to high energy electron irradiation to a dose of 100×10$^6$ roentgens employing electrons having a peak voltage of 1,000,000 electron volts. This results in a strong, flexible silicone rubber which is particularly useful as gasketing materials for automotive transmissions.

Example 14

A solution of 79.1 parts pyridine dissolved in 1750 parts benzene was added to a reaction vessel. Simultaneously over a three-hour period, a first solution of 207.3 parts tetraphenyldisiloxanediol-1,3 in 700 parts benzene and a second solution of 95.5 parts of methylphenyldichlorosilane in 825 parts benzene was added. The resulting mixture was allowed to stand for 14 hours after which the benzene was stripped from the reaction mixture at a temperature of 35 to 40° C. at a pressure of 18 to 20 mm. The resulting solid residue was then redissolved in 270 parts toluene and washed four times with 250 part volumes water to remove any water-soluble impurities. The toluene was then stripped from the solution at 35 to 40° C. and 18 to 20 mm., leaving a solid residue which was distilled at a temperature of from about 236 to 239° C. at a pressure of 0.02 mm. to yield 230.1 parts of methylpentaphenylcyclotrisiloxane, having a melting point of 111 to 113.5° C. The identity of this material was confirmed by its infrared curve which was identical to that of the product of Example 13. The yield of cyclotrisiloxane corresponded to 88.1 percent.

Example 15

To a solution of 8.4 parts methyl-beta-cyanoethyldichlorosilane and 15 parts pyridine in 210 parts diethyl ether was added a solution of 20.7 parts tetraphenyldisiloxanediol-1,3 in 70 parts diethyl ether. The resulting reaction mixture was stirred for two hours and allowed to stand for 16 hours at room temperature, during which time pyridine hydrochloride precipitated from the reaction mixture. This pyridine hydrochloride was removed by filtration and the solvent was removed by evaporation. This resulted in a solid material which was dissolved in hot toluene and the solution was filtered to remove a minor amount of pyridine hydrochloride which remained. The toluene was then removed by evaporation and the resulting solids were recrystallized from a mixture of 4 parts by volume of cyclohexane and 1 part by volume of ethanol. The resulting purified material was 1-methyl-1-beta-cyanoethyl-3,3,5,5-tetraphenylcyclotrisiloxane having the formula:

(18) 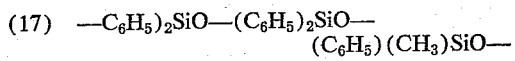

This white crystalline material had a melting point of 100.5 to 101.5° C. Infrared analysis revealed a doublet at 8.9 and a peak at 13.9 microns corresponding to the diphenylsiloxy unit; a peak at 9.8 microns corresponding to the trisiloxane ring; a peak at 7.9 microns corresponding to the methylsilyl group; and peaks at 4.45, 8.4, 11, and 11.3 corresponding to the beta-cyanoethylsilyl group. Chemical analysis showed the presence of 2.83% N as compared with the theoretical value of 2.75% N. Seven and one-half parts of this cyclotrisiloxane was heated to a temperature of about 120° C. and held at a pressure of about 10 microns to remove any entrained moisture or air. To the molten cyclic material was added 0.1 part of a 0.4 percent solution of potassium hydroxide in octamethylcyclotetrasiloxane and the catalyzed mixture was maintained at a temperature of about 120° C. for 15 minutes during which time the cyclic material polymerized to a tough, translucent gum consisting essentially of the following recurring structural units:

(19)

—(C$_6$H$_5$)$_2$SiO(C$_6$H$_5$)$_2$SiO—
   (CH$_3$)(NCCH$_2$CH$_2$)SiO—

Infrared analysis of this polymeric material revealed a structure substantially identical to the structure of the cyclopolysiloxane except that the absorption peak characteristic of the cyclotrisiloxane unit was no longer present. This polymeric material is converted to a silicone rubber by milling one part of the material with 0.4 part of a finely divided precipitated silica and subjecting the milled material to a dose of 100×10$^6$ roentgens with electrons having energies of 800,000 kilovolts peak. The resulting rubber has a high tensile strength and elongation and is resistant to the swelling effect of hydrocarbon solvents and exhibits outstanding thermal stability.

Example 16

To a reaction vessel containing 79.1 parts pyridine dissolved in 1750 parts benzene were added over a 2.5 hour period simultaneously two other solutions. The first other solution contained 207.3 parts tetraphenyldisiloxanediol-1,3 dissolved in 700 parts benzene and the second other solution contained 84.1 parts of methyl-beta-cyanoethyldichlorosilane dissolved in 825 parts benzene. After the addition, the reaction mixture was allowed to stand at room temperature for 12 hours. A precipitate which had formed was filtered off and the filtrate was stripped at 35 to 40° C. at a pressure of 18 to 20 mm. to remove the benzene. The resulting solids were redissolved in 275 parts toluene and the toluene solution was washed four times with 250 part batches of water to remove any traces of water-soluble materials. The toluene was then stripped from the reaction mixture at 35 to 40° C. and 18 to 20 mm. to leave a solid which was fractionally recrystallized from cyclohexane to produce 238.9 grams of 1-methyl-1-beta-cyanoethyl-3,3,5,5-tetraphenylcyclotrisiloxane whose infrared curve was identical to that of the cyclic product obtained in Example 15. This material had a melting point of 102.5 to 103.5° C. and the recovery amounted to a 93.7 percent yield.

Example 17

Following the procedure of Example 13, 1,1-bis-(beta-cyanoethyl) - 3,3,5,5 - tetraphenylcyclotrisiloxane having the formula:

(20) 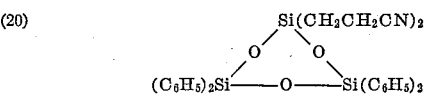

is prepared by effecting reaction between bis-(beta-cyanoethyl)dichlorosilane and tetraphenyldisiloxanediol - 1,3. This cyclic material is converted to a homopolymer by the procedure of Example 13 and the homopolymer is then converted to a silicone rubber by mixing one part of the homopolymer with 0.4 part of precipitated silica and irradiating the resulting material to a dose of 100×10⁶ roentgens with electrons having energies of 800,000 kilovolts peak.

*Example 18*

Bis-(m-trifluoromethylphenyl)dichlorosilane was prepared by refluxing a mixture of 225 parts of m-trifluoromethylphenylbromide, 24 parts of magnesium turnings, and 700 parts diethyl ether for 4 hours and cooling the resulting Grignard reagent to 0° C. Over a period of 1.5 hours 85 parts of silicon tetrachloride was added and the resulting mixture was fractionally distilled to produce bis-(m-trifluoromethylphenyl)dichlorosilane which boiled at 86 to 90° C. at 0.09 mm. To a solution of 12.2 parts pyridine in 170 parts diethyl ether were simultaneously added a solution of 15.8 parts of the aforementioned bis-(m-trifluoromethylphenyl)dichlorosilane in 60 parts diethyl ether and a solution of 16.9 parts of tetraphenyldisiloxanediol-1,3 in 55 parts diethyl ether. After the addition, the reaction mixture was stirred and allowed to stand for 16 hours, during which time pyridine hydrochloride precipitated. This precipitate was removed by filtration and the ether was removed by evaporation, resulting in an oily residue. This residue was dissolved in toluene and some additional pyridine hydrochloride precipitate was removed. The toluene was then removed by evaporation resulting in a crude solid product. These solids were recrystallized several times from a mixture of equal volumes of hot cyclohexane and ethanol to produce 1,1 - bis-(m-trifluoromethylphenyl)-3,3,5,5 - tetraphenylcyclotrisiloxane having the formula:

(21) 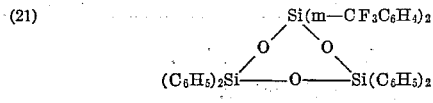

This material was a white crystalline solid having a melting point of 111.5 to 113° C. Infrared analysis of this material showed a peak at 9.8 microns corresponding to the cyclotrisiloxane ring, a doublet at 8.9 microns and a peak at 13.9 microns corresponding to the diphenylsiloxane groups and peaks at 7.5, 8.6, 9.3, and 12.5 microns corresponding to the trifluoromethylphenyl groups. Elemental analysis of this material showed the presence of 62.5% carbon, 4.2% hydrogen, 11.6% silicon and 15.4% fluorine as compared with the theoretical values of 62.5% carbon, 3.8% hydrogen, 11.5% silicon and 15.6% fluorine. A polymer was prepared by heating 7.5 parts of this cyclotrisiloxane to a temperature of 125° C. and subjecting the resulting molten material to a pressure of 10 microns to remove any entrained moisture and air. To the molten material was then added 0.1 part of a 0.4 percent potassium hydroxide solution in octamethylcyclotetrasiloxane. Upon completion of the addition, polymerization began at once. At the end of 20 minutes, a high molecular weight polydiorganosiloxane was formed which consisted essentially of the following recurring structural units:

(22) —(C₆H₅)₂SiO—(C₆H₅)₂SiO—
  (m—CF₃C₆H₄)₂SiO—

This polymer was a hard, solid material which was soluble in toluene and which had an intrinsic viscosity of 1.07 deciliters per gram in toluene at 30° C. The molecular weight of this polymer was about 360,000. This polymer contained about 5,000 of the recurring structural units of Formula 22 per molecule. The infrared curve of this polymer corresponded to the infrared curve of the cyclic polydiorganosiloxane starting material, except that absorption bands corresponding to the cyclotrisiloxane ring were no longer present. An encapsulated transformer is prepared by placing a transformer in a container, heating a portion of this polymer to a temperature of 100° C., at which temperature it softens, and forcing the polymer in the space between the container and the transformer. After cooling to room temperature, the encapsulated transformer is removed from the container.

*Example 19*

Following the procedure of Example 18, p-trifluoromethylphenyl pentaphenylcyclotrisiloxane is formed by reacting equimolar amounts of phenyl-p-trifluoromethylphenyldichlorosilane and tetraphenyldisiloxanediol-1,3. The resulting material has the formula:

(23) 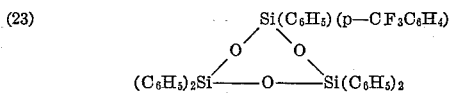

Following the procedure of Example 18, this cyclotrisiloxane is rearranged and condensed with potassium hydroxide to form a high molecular weight polydiorganosiloxane consisting essentially of the following recurring structural units:

(24) —(C₆H₅)₂SiO—(C₆H₅)₂SiO—
  (C₆H₅)(p—CF₃C₆H₄)SiO—

This high molecular weight material is used to encapsulate a transformer by the process of Example 18.

*Example 20*

To a reaction vessel containing 79.1 parts pyridine dissolved in 1750 parts benzene were simultaneously added a first solution of 207.3 parts tetraphenyldisiloxanediol-1,3 in 700 parts benzene and a second solution of 77.6 parts methylallyldichlorosilane in 825 parts benzene. The addition took place over a two-hour period and at the end of this time the reaction mixture was allowed to stand for 12 hours. At the end of this time, a precipitate which had formed was filtered and the filtrate was stripped of benzene solvent at a temperature of 35 to 40° C. and a pressure of 18 to 20 mm. The resulting solid residue was redissolved in 275 parts toluene and the toluene solution was washed four times with water. The toluene was then stripped under the same conditions as the benzene, resulting in a solid material which was distilled at a temperature of from 213 to 217° C. at a pressure of 0.02 mm. to produce 216.3 parts of a white crystalline solid material having a melting point of 63 to 64° C. This material was 1 - methyl-1-allyl - 3,3,5,5-tetraphenylcyclotrisiloxane having the formula:

(25) 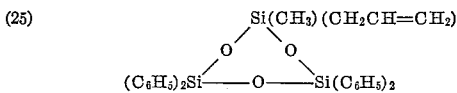

This material was recovered in a yield of 87.3 percent. Identity of the material was confirmed by infrared analysis which showed a doublet at 8.9 microns and a peak at 13.9 microns corresponding to the diphenylsiloxy units, a peak at 9.8 microns corresponding to the cyclotrisiloxane ring, a peak at 7.9 microns corresponding to the methylsilyl group, and a peak at 6.1 microns corresponding to the allylsilyl group.

While the foregoing examples have illustrated many of the embodiments of my invention, the process of the present invention is applicable broadly to the reaction of tetraphenyldisiloxanediol-1,3 with the diorganodichlorosilanes within the scope of Formula 3 to produce cyclotrisiloxanes within the scope of Formula 1 in unexpectedly high yields. In addition to the use of the cyclotrisiloxanes of the present invention in polymerizations to form high molecular weight linear polymeric materials, these cyclotrisiloxanes can also be polymerized with other types of cyclotrisiloxanes to form other useful organosilicon polymers.

What I claim as new and desire to secure by Letters Patent of the United States is:

1. The process for preparing cyclotrisiloxanes having the formula:

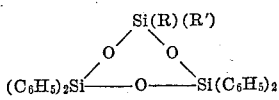

which comprises contacting tetraphenyldisiloxanediol-1,3 with a diorganodihalogenosilane having the formula:

in the presence of a hydrogen halide acceptor and a solvent which is inert to the reactants under the conditions of the reaction and isolating said cyclotrisiloxane from the reaction mixture, where the ingredients are present in the molar ratio of one mole of tetraphenyldisiloxanediol-1,3, from 0.5 to 2 moles of said diorganodihalogenosilane, and from about 2 to 30 moles of said hydrogen halide acceptor per mole of whichever of the first two ingredients is present in smaller amount, and where R and R' each represent members selected from the class consisting of monovalent hydrocarbon radicals, halogenated monovalent hydrocarbon radicals, and cyanoalkyl radicals, and X is halogen.

2. The process of claim 1 in which X is chlorine.
3. The process of claim 2 in which the hydrogen halide acceptor is a tertiary amine.
4. The process of claim 3 in which R is methyl.
5. The process of claim 3 in which both R and R' are methyl.
6. The process of claim 3 in which R is methyl and R' is phenyl.
7. The process of claim 3 in which R is methyl and R' is an alkenyl radical.
8. The process of claim 3 in which R is methyl and R' is beta-cyanoethyl.
9. The process of claim 3 in which both R and R' are m-trifluoromethylphenyl radicals.
10. The process for forming cyclotrisiloxanes having the formula:

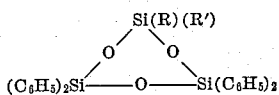

which comprises contacting in the presence of a solvent inert to the reactants under the conditions of the reaction, ingredients in the ratio of one mole of tetraphenyldisiloxanediol-1,3, from 0.5 to 2 moles of a diorganodichlorosilane having the formula:

and from about 2 to 30 moles of a tertiary amine per mole of whichever of the first two reactants is present in smaller amount and recovering the formed cyclotrisiloxane, where R and R' each represent a member selected from the class consisting of monovalent hydrocarbon radicals, halogenated monovalent hydrocarbon radicals, and cyanoalkyl radicals.
11. The process of claim 2 in which the hydrogen halide accepor is pyridine.

References Cited
UNITED STATES PATENTS

| | | | |
|---|---|---|---|
| 2,645,628 | 6/1953 | Hurd | 260—448.2 |
| 2,991,266 | 7/1961 | Bluestein et al. | 260—448.2 |
| 3,037,962 | 6/1962 | Hartung et al. | 260—448.2 |
| 3,110,720 | 11/1963 | Pike | 260—448.2 |

TOBIAS E. LEVOW, *Primary Examiner.*

P. F. SHAVER, *Assistant Examiner.*